E. SWENSEN.
ELECTRICAL SYSTEM FOR USE IN CATTLE STALLS.
APPLICATION FILED MAY 20, 1920.
1,411,312. Patented Apr. 4, 1922.
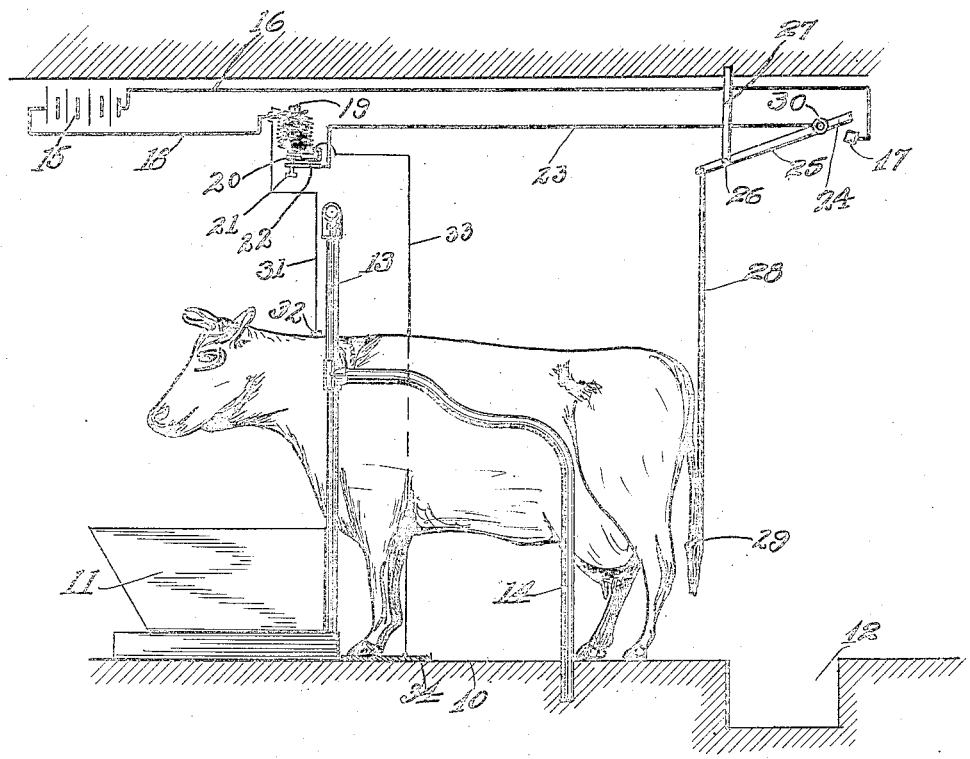

UNITED STATES PATENT OFFICE.

ELMER SWENSEN, OF VALDERS, WISCONSIN.

ELECTRICAL SYSTEM FOR USE IN CATTLE STALLS.

1,411,312. Specification of Letters Patent. Patented Apr. 4, 1922.

Application filed May 20, 1920. Serial No. 382,836.

*To all whom it may concern:*

Be it known that I, ELMER SWENSEN, a citizen of the United States, residing at Valders, in the county of Manitowoc and State of Wisconsin, have invented new and useful Improvements in Electrical Systems for Use in Cattle Stalls, of which the following is a full, clear, concise, and exact description, reference being had to the accompanying drawing, forming a part of this specification.

My invention relates to an electrical system adapted for use in cattle stalls.

It is especially desirable in stalls, and especially where a large number of animals are kept, to provide some means which will cause the animal in the stall to step backwardly at the time of evacuation to deposit the droppings of the animal in a gutter suitably located at the rear of the stall.

It is therefore one object of my invention to provide electrical means which subjects the animal to an electrical shock at the time of evacuation.

Another object of my invention is to provide an electrical circuit in connection with the animal which may be opened and closed by said animal.

In the drawing in which one embodiment of my invention is shown:

The figure is an elevational view of an animal stall showing a partially diagrammatic electrical system in connection therewith; and for purposes of illustration showing a cow in the stall.

In order to give a general idea of the invention it is here stated that the construction comprises a stall having a floor portion 10 of suitable length to allow the animal to stand or lie comfortably therein. A trough or feed box 11 is suitably positioned at the forward end of said stall and cutaway from the floor portion to the rear of where the animal generally stands is a gutter 12. Supported in the floor portion 10 is a stall 13 having a side member 14, also supported in the floor, to prevent shifting of the animal from the proper position in the stall. An electrical system comprising a primary and secondary circuit is suitably positioned with relation to the animal so as to subject the animal to an electrical shock and cause her to step backwardly when the period of evacuation takes place, whereby the animal will deposit the droppings in the gutter 12.

To give a more detailed description of my construction, the primary circuit comprises a battery 15 having a wire 16 leading therefrom to a switch 17. Another wire 18 leads from the battery 15 and is wound around a core 19. As shown diagramatically herein a vibrator is positioned in operative relation with respect to said core. The vibrator comprises a contact member 20 which vibrates between the end of the core 19 and a set screw 21 which is threaded into an arm 22. The primary wire after being wound around the core 19 leads therefrom to the contact member 20, and another lead 23 of the primary wire is secured to the arm 22 and leading therefrom to a movable contact 24 of the switch 17. Said movable contact 24 as shown herein, forms a portion of a lever arm 25 which is pivoted at 26 to a stationary rod 27 suitably suspended from the roof or wall of the building, as preferred.

As shown in the drawing a flexible member such as a rope 28 is secured to the end of the lever 25 opposite the switch contact 24, said rope being secured at its other end to the tail of the animal as shown at 29. When a rope is used as shown in the illustration it is desirable that a weight 30 be used to effect the tilting of said lever when the animal's tail is raised. A rigid member such as a rod or heavy wire could be substituted for the rope in which case the weight could be dispensed with.

The secondary circuit comprises fine wiring wound many times around the core 19. One end 31 of said secondary wire leads from the windings on the core to a contact bar or member 32 resting on the shoulders of the animal. The other end 33 of said secondary wire leads to a wire mat or conducting plate 34 upon which the front legs of the animal rest while in the usual standing position as shown in the illustration.

The operation of the device is as follows: Immediately prior to the period of evacuation the animal will naturally raise its tail. This will cause the lever 25 to tilt and the switch to close, whereby the primary circuit will be completed, and the core 19 magnetized. The contact member 20 which is normally spring-retained away from the core 19, is magnetically drawn toward the core 19 thereby interrupting the primary current and inducing a secondary current into the many windings of fine wire which are also wound around the core 19.

The secondary current is transmitted to the animal by means of the bar 32 resting across the shoulders of the animal and the conducting plate or mat 34 upon which the front legs of the animal rest.

The animal will, therefore, upon raising its tail and closing the switch, be subjected to a sudden electrical shock and step backwardly off of the mat 34 to a proper position to deposit the droppings in the gutter 12.

Although I have shown herein only one embodiment of my invention it is to be understood that any variations or modifications thereof come within the spirit and scope of the appended claims.

Having thus described my invention, what I claim as new and desire to secure by Letters Patent is—

1. The combination with a stall and a gutter, of electrical means controlled by movement of the animal for causing the animal in the stall to move back toward the gutter.

2. The combination with a stall and a gutter, of means controlled by movement of the animal's tail for causing the animal in the stall to move back toward the gutter.

3. An animal controlling device comprising means controlled by the animal's tail for causing the animal to move backwardly, said means comprising means for electrical connection with the fore part of said animal.

In witness whereof, I have hereunto subscribed my name.

ELMER SWENSEN.